(12) United States Patent
Castro et al.

(10) Patent No.: US 9,124,648 B2
(45) Date of Patent: Sep. 1, 2015

(54) SOFT TYPE BINDING FOR DISTRIBUTED SYSTEMS

(75) Inventors: Pablo Castro, Redmond, WA (US);
Andrew Conrad, Sammamish, WA (US); Michael Flasko, Duvall, WA (US); Pratik Patel, Bothell, WA (US); Mark Ashton, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 12/404,385

(22) Filed: Mar. 16, 2009

(65) Prior Publication Data

US 2010/0146036 A1    Jun. 10, 2010

Related U.S. Application Data

(60) Provisional application No. 61/120,975, filed on Dec. 9, 2008.

(51) Int. Cl.
*G06F 15/16* (2006.01)
*G06F 3/00* (2006.01)
*H04L 29/08* (2006.01)

(52) U.S. Cl.
CPC .............. *H04L 67/2823* (2013.01); *H04L 67/02* (2013.01); *H04L 67/2876* (2013.01)

(58) Field of Classification Search
CPC ......... H04L 51/00; H04L 67/10; G06F 9/546; G06Q 10/06
USPC ........................................... 709/202; 719/315
See application file for complete search history.

(56) References Cited

U.S. PATENT DOCUMENTS

| | | | |
|---|---|---|---|
| 5,796,393 A | 8/1998 | MacNaughton et al. | |
| 6,356,907 B1 * | 3/2002 | Hopmann | 1/1 |
| 6,466,966 B1 | 10/2002 | Kirsch et al. | |
| 6,633,923 B1 * | 10/2003 | Kukura et al. | 719/316 |
| 7,325,007 B2 | 1/2008 | Castro et al. | |
| 2004/0010519 A1 * | 1/2004 | Sinn et al. | 707/200 |
| 2008/0222652 A1 * | 9/2008 | Lambert et al. | 719/315 |
| 2008/0301430 A1 | 12/2008 | Bradley et al. | |
| 2010/0125844 A1 * | 5/2010 | Mousseau et al. | 718/1 |
| 2010/0153862 A1 * | 6/2010 | Schreiber | 715/760 |

OTHER PUBLICATIONS

Jin et al., "A Study of Data Exchange Protocols for the Grid Computing Environment", Third International Conference on Networking and Services, ICNS, IEEE, Jun. 19-25, 2007, 75 pages.

Lee, "Microsoft SQL Data Services—Under the Hood", Microsoft, Oct. 2008, 14 pages.

(Continued)

*Primary Examiner* — Peling Shaw
(74) *Attorney, Agent, or Firm* — Henry Gabryjelski; Kate Drakos; Micky Minhas (57) ABSTRACT

Data communications are enabled to be performed between first and second computer systems without having to match data types at the first and second computer systems. A first data type is associated with a request for a resource. The request for the resource is transmitted from a first agent at the first computer system to a second agent at the second computer system. The resource is instantiated at the second computer system according to a second data type that is different from the first data type. The resource is received by the first agent from the second agent. The received resource is materialized into an instance of the first data type using the first agent.

20 Claims, 6 Drawing Sheets

(56) References Cited

OTHER PUBLICATIONS

Chen et al., "An Agent-based Process Environment for Electronic Commerce", Tamkang Journal of Science and Engineering, vol. 3, No. 2, 2000, pp. 91-95.

Wu, Guoshi, "SOA Principles & Practice", Lecture 4 SOAP, retrieved on Apr. 15, 2015, 97 pages.

Oh et al., "Interaction Translation Methods for XML/SNMP Gateway Using XML Technologies", DP&NM Lab. Postech, Korea, 2004, 14 pages.

* cited by examiner

SOFT TYPE BINDING FOR DISTRIBUTED SYSTEMS

This application claims the benefit of U.S. Provisional Application No. 61/120,975, filed on Dec. 9, 2008, which is incorporated by reference herein in its entirety.

BACKGROUND

Computer systems may be coupled together in various ways to enable communications between them, including being coupled together in networks such as local area networks (LANs), wide area networks (WANs), or combinations of networks, such as the Internet. Data may be transferred (e.g., copied or moved) between computer systems in various ways. For example, a computer system may include an "agent" configured to perform data transfers with other computer systems. For instance, a first computer system, which may be referred to as a "client," may include a "client agent" configured to request data from a "server agent" located at a second computer system, referred to as a "server." Communications may occur in both directions between the first computer system and the second computer system, such that each of the first and second computer systems may be considered to be the client in some communications, and may be considered to be the server in other communications.

An example of a distributed system of computers is a service-oriented architecture (SOA) system. The SOA provides techniques for systems development and integration. Typically, functionality is grouped around business processes, which may be packaged as interoperable services. A SOA infrastructure allows different applications to exchange data with one another as they participate in business processes. Service-orientation aims at a loose coupling of services with operating systems, programming languages and other technologies which underlie the different applications.

Loosely-coupled distributed systems based in architecture styles such as SOA face challenges when it comes to interaction between the development environments used to build the nodes that make up the system. When agents in a system exchange data, each agent preferably represents that data as instances of known data types, which enables the development environment to validate the structure and constraints of the data (e.g. data types), as well as assist the developer through the knowledge of those types. Many technologies depend on type information, including IntelliSense® and LINQ (language integrated query), both developed by Microsoft Corporation of Redmond, Wash.

However, extensive use of common data types introduces increased coupling between agents in a data communication system. For example, the use of common data types typically prevents client and server applications from being developed independently or from using different conventions or type hierarchies, and does not allow them to version independently. SOAP (originally defined as Simple Object Access Protocol) stacks allow for a varying level of flexibility when it comes to exposing "proxy" types for the data types received at client from a server, as defined in the server-provided metadata document (typically a "WSDL" (Web Services Description Language) file). However, this is still a form of mapping and it still requires the client to know the original type names and hierarchy in order to map them back before interacting with the server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products for soft type binding for distributed systems are described herein. Using soft type binding, data communications are enabled to be performed between first and second computer systems without having to match data types at the first and second computer systems.

In a first implementation, a method in a first computer system that includes a first agent is provided. A first data type is associated with a request for a resource. The request for the resource is transmitted to a second agent at a second computer system. The resource is instantiated at the second computer system according to a second data type that is different from the first data type. The resource is received from the second agent. The received resource is materialized into an instance of the first data type using the first agent.

The resource includes one or more properties represented as name/value pairs that each includes a property name and a data value. The name/value pairs are instantiated (e.g., materialized) at the second computer system according to the second data type. The properties are materialized at the first computer system as an instance of the first data type by the first agent.

In an example, the second data type may include a property that is not included in the first data type. The property may be omitted from the instance of the first data type. Alternatively, a failure to fully materialize the resource as an instance of the first data type may be indicated.

In another example, the first data type may include a property that is not included in the second data type. A default value may be used for a data value of the property in the instance of the first data type.

In another implementation, a client agent in a first computer system includes a data request module and a materialization module. The data request module is configured to receive a request for a resource. The request has an associated first data type. The resource is instantiated at a second computer system according to a second data type that is different from the first data type.

The materialization module receives the resource from a server agent at the second computer in response to the request being transmitted from the first computer system. The materialization module is configured to materialize the received resource into an instance of the first data type.

In another implementation, a method in a first computer system that includes a first agent is provided. A first data type is associated with a request for a resource. The request for the resource is transmitted to a second agent at a second computer system. The resource is instantiated at the second computer system according to a second data type that is different from the first data type. The resource and an indication of the second data type are received from the second agent. The second data type is mapped to a third data type. The third data type is a subtype of the first data type. The received resource is materialized into an instance of the third data type.

Computer program products are also described herein that enable data communications, client agents, server agents, the instantiating of received resources according to client-side data types, the mapping of data types, and further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Data Communication Systems

Figure 1:
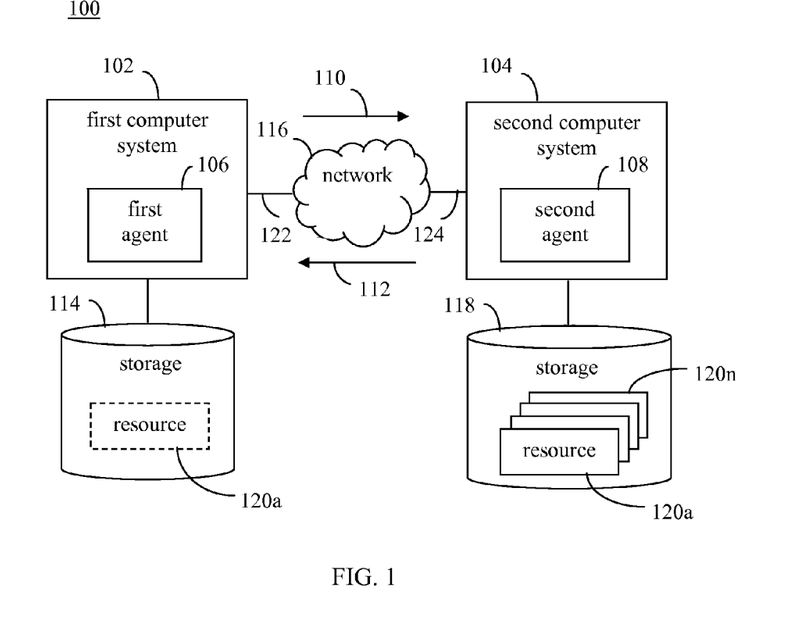
FIG. 1 shows a block diagram of a data communication system, according to an example embodiment.

Embodiments of the present invention relate to data communications in distributed systems. For example, FIG. 1 shows a block diagram of a data communication system 100, according to an example embodiment. As shown in FIG. 1, system 100 includes a first computer system 102, a second computer system 104, a first storage 114, a network 116, and a second storage 118. First computer system 102 includes a first agent 106 (e.g., client agent), and second computer system 104 includes a second agent 108 (e.g., server agent). Storage 114 is coupled to first computer system 102. Storage 118 is coupled to second computer system 104. First and second computer systems 102 and 104 are communicatively coupled by network 116. First and second computer systems 102 and 104 may be computer systems in a distributed system of computers, such as a service-oriented architecture (SOA) system or other type of system. System 100 is configured to enable data transmissions between first and second computer systems 102 and 104. These elements of system 100 are described as follows.

First and second computer systems 102 and 104 may each be any type of computing device, including a desktop computer (e.g., a personal computer), a server, a mobile computer or computing device (e.g., a Palm® device, a RIM Blackberry® device, a personal digital assistant (PDA), a laptop computer, a notebook computer, etc.), or other type of computer system.

Storage 114 and storage 118 may each include one or more of any type of storage mechanism to store content (e.g., objects), including a hard disk drive, an optical disc drive, a memory device such as a RAM device, a ROM device, etc., and/or any other suitable type of storage medium. Storage 114 and storage 118 may include long term storage (e.g., a hard disk drive) or temporary storage (e.g., a RAM device).

Network 116 may include one or more communication links and/or communication networks, such as a PAN (personal area network), a LAN (local area network), a WAN (wide area network), or a combination of networks, such as the Internet. First and second communication links 122 and 124, which respectively couple first and second computer systems 102 and 104 to network 116, may include any number of communication links, including wired and/or wireless links, such as IEEE 802.11 wireless LAN (WLAN) wireless links, Worldwide Interoperability for Microwave Access (Wi- MAX) links, cellular network links, wireless personal area network (PAN) links (e.g., Bluetooth™ links), Ethernet links, USB links, etc.

First agent 106 and second agent 108 may be implemented in hardware, software, firmware, or any combination thereof. For example, first agent 106 and/or second agent 108 may be implemented as computer program code configured to be executed in one or more processors. Alternatively, first agent 106 and/or second agent 108 may be implemented as hardware logic/electrical circuitry.

First agent 106 is configured to perform a request for data for first computer system 102. For instance, first agent 106 may generate a request for a resource that is accessible at second computer system 104, which is transmitted from first computer system 102 in a first communication signal 110. First communication signal 110 is transmitted from first computer system 102 through a first communication link 122, network 116, and a second communication link 124, to second computer system 104. First communication signal 110 may be transmitted in any form, including in the form of a stream of packets (e.g., IP packets). Second computer system 104 receives first communication signal 110.

Second agent 108 processes the request received in first communication signal 110. For example, the request received from first agent 106 may be for a resource 120a (e.g., of a plurality of resources 120a-120n) stored in storage 118 associated with second computer system 104. Second agent 108 retrieves resource 120a from storage 118 to include in a response. In an embodiment, resource 120a may be structured data defined by a data type. Data types are well known to persons skilled in the relevant art(s). A data type typically includes a name and a structure, which may be defined by a set of one or more properties. A data type may also include a behavior. For purposes of brevity, behaviors are not further described herein, but may be present in some data types. Data types represent structured types of data that are processible by associated applications.

Figure 2:
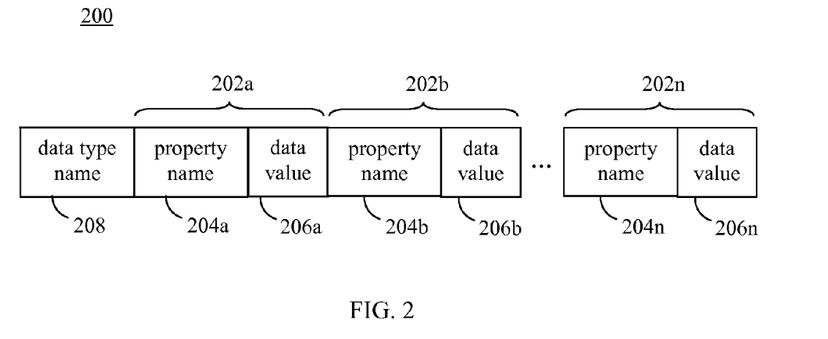
FIG. 2 shows a block diagram of an example resource.

For example, FIG. 2 shows a block diagram of a resource 200 or data item, which is an example of resource 120a. Resource 200 is structured according to a data type, indicated by a data type name 208, such as "Employee" (e.g., when the data type is used to represent employee data) or other name, which may be descriptive of a structure of the included data. As shown in FIG. 2, resource 200 has a structure defined by a set of properties 202a-202n. Resource 200 may include one or more properties 202. As shown in FIG. 2, properties 202a-202n are each expressed as a name/value pair, each name/value pair including a corresponding property name 204 and a data value 206. For example, property 202a includes a property name 204a and a data value 206a, and property 202b includes a property name 204b and a data value 206b. Each property name 204 has a value that is a name for the corresponding property 202, and the corresponding data value 206 is a data value for the property 202 in resource 200. For instance, in an example where data type name 208 for resource 200 is "employee," property name 202a may be "name," and data value 202b may be "Tom Smith," property name 202b may be "birth date," and data value 202b may be "1976-08-27," and a property name 202c may be "office number," and data value 202c may be "B1078."

Referring back to FIG. 1, second agent 108 may convert resource 120a from its particular data type to a data format that may be transmitted from computer system 104 (e.g., a wire format), as would be known to persons skilled in the relevant art(s). Second computer system 104 generates a second communication signal 112, which is a response signal that includes the requested resource and includes an indication of the data type used for resource 120a at second computer system 104. Second communication signal 112 is transmitted through second communication link 124, network 116, and first communication link 122, and is received by first computer system 102. Second communication signal 112 may be transmitted in any form, including in the form of a stream of packets (e.g., IP packets).

First agent 106 processes resource 120a received in second communication signal 112. In a conventional data communication environment, first agent 106 converts the received version (e.g., wire format) of resource 120a to the indicated data type in which resource 120a was formatted at second computer system 104. This is because in conventional data communication systems, first and second agents 106 and 108 use the same data types to represent data. Thus, in an example where resource 120a has the "Employee" data type at second computer system 104, first and second computer systems 102 and 104 contain a common definition of the "Employee" data type, and resource 120a is also assigned the "Employee" data type at first computer system 102. First agent 106 may optionally store the received resource 120a in storage 114 (as indicated by dotted lines in FIG. 1).

Such conventional data communications have deficiencies due to the need to use common data types among different distributed computer systems. When agents in a system exchange data, each agent preferably represents that data as instances of data types that are known to the other agents, which enables the development environment to validate the structure and constraints of the data, as well as assist the developer through the knowledge of those types. However, extensive use of common data types introduces increased coupling between agents in a data communication system. For example, the use of common data types typically prevents client and server applications from being developed independently or from using different conventions or type hierarchies, and does not allow them to safely version independently.

Embodiments of the present invention overcome such deficiencies in conventional data communication systems, enabling different distributed computer systems to use different data types. Examples of such embodiments are described below.

III. Example Embodiments

Embodiments of the present invention enable different distributed computer systems to use different data types. The example embodiments described herein are provided for illustrative purposes, and are not limiting. Furthermore, additional structural and operational embodiments, including modifications/alterations, will become apparent to persons skilled in the relevant art(s) from the teachings herein.

Embodiments enable interacting first and second agents (e.g., a client and a server) to exchange structured data such that what is important is the structure of the data, and data typing can be applied at the end points independently. Such embodiments enable interacting first and second agents to use different type names, types with different structures (e.g., different numbers of properties) for a given item, and in certain cases even different inheritance hierarchies, where either one or both of the first and second agents may be using inheritance.

Client and server type names are enabled to be independent of each other. A client application developer may select the type to be used to materialize a given data item by indicating a type at the time the request is made instead of relying on the data items (e.g., the resource received in the response) themselves transporting type information.

In an embodiment, a data communication between a client and server may not include a data type name for a data item being exchanged. In another embodiment, a data communication between a client and server may include a data type name in addition to the data item, and the client may ignore the data type name (e.g., overriding the provided data type name with a client-specified data type), may map the provided data type name to a client side data type, or may honor the provided data type name "as-is" if it happens to match a data type of the client.

Furthermore, the structures of the data types used at the client and at the server do not need to match. For example, the data type at the client may include a different number of properties than the data type at the server. A client may receive a data item and may materialize the received data item into an instance of a client data type. If the received data item does not include properties corresponding to the client data type, during materialization, those properties may be provided with default values in the materialized data item. If the received data item includes properties that are not included in the client data type, the materialization process can be configured to fail, or to materialize the data item with those properties omitted. This enables servers to introduce new properties in newer versions of a system without becoming unable to communicate with older version clients. Furthermore, this enables clients to use data types with a structure that only covers the portions of the data received from the server that is interesting for a particular application at the client.

Embodiments herein may be referred to as "soft-binding" of data types between clients and servers. Soft-binding addresses the challenges around versioning and type de-coupling of independent cooperating agents in a distributed system by introducing a client-side materialization strategy that does not depend on coupled client/server types. Example embodiments for soft-binding data communications are described in the following subsections.

A. Example Base Materialization Embodiments

"Client agents" are referred to herein as agents in a distributed system that connect to a data source (e.g., "server agents") to consume or manipulate data. A client agent does not control the structure of data items received from a server agent, or versioning of the server agent. The process of taking a transportable representation of a data item (i.e., "wire format") and turning it into an instance of a known type of object is referred to as "materialization."

Materialization techniques generally include a determination of a data type to be used at the client based on the incoming data item data or metadata, and then setting each of the properties of the target instance to the value of the corresponding property in the incoming data item. Traditionally, systems have enforced strict matching of most or all structural aspects (e.g., properties) between data items and their target materialized forms. While this is beneficial in closed systems, this is difficult to implement among agents that in distributed computer systems (e.g., computer systems that are coupled together over a network, including the Internet). Furthermore, strict matching increases the difficulty of versioning of broadly consumed services.

Materialization embodiments described herein use soft binding techniques that are more flexible. In an embodiment, a target type (a data type at the client) for materialization is established when the request is formulated (prior to transmitting the request), and is not determined by the response from the server (is not determined by the contents of the response, which may indicate the data type used for the requested data item at the server). The target type does not need to structurally match the shape (e.g., the number and types of properties) of the incoming data items. The target type could be a superset, a subset or an exact match with the server data type.

Figure 3:
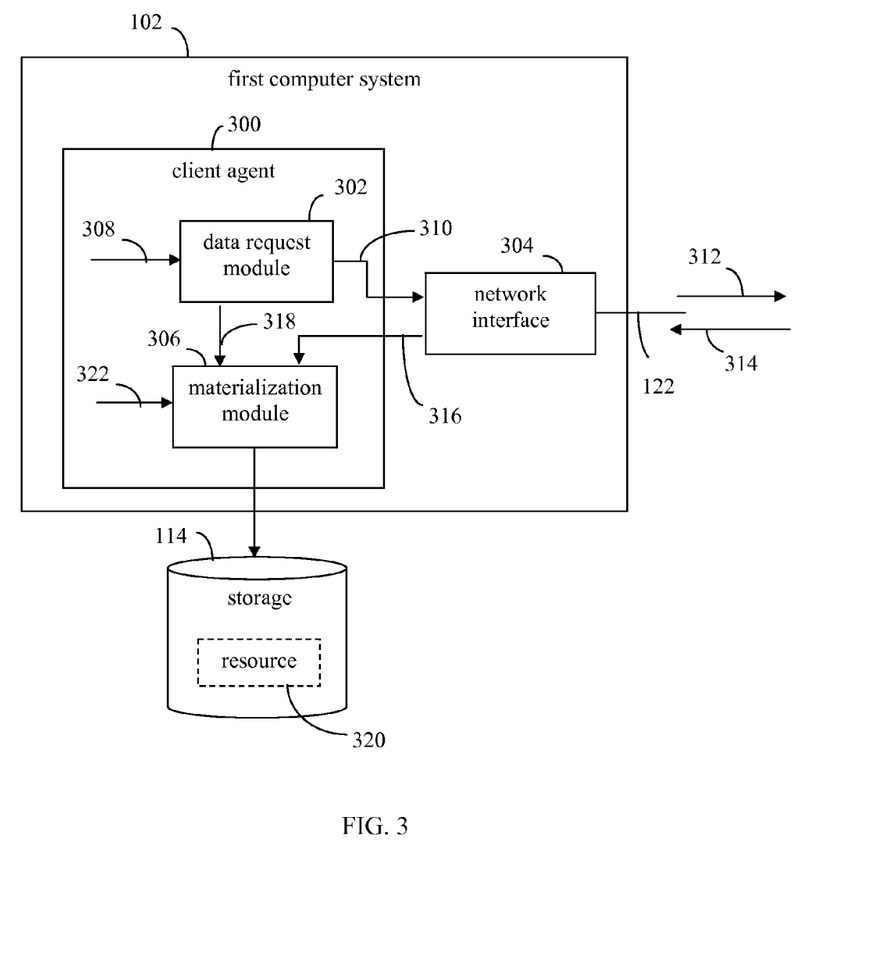
FIG. 3 shows a block diagram of a client agent, according to an example embodiment of the present invention.
Figure 4:
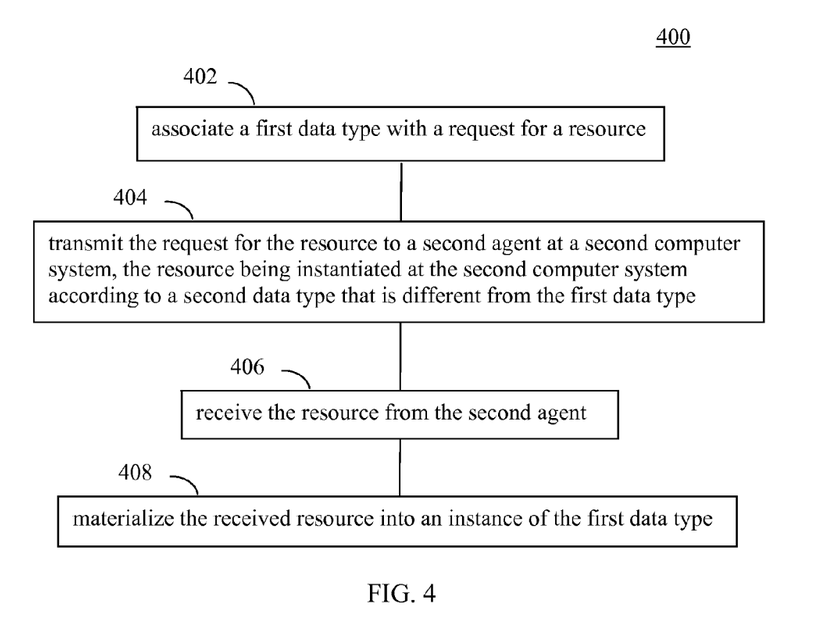
FIG. 4 shows a flowchart for a data communication between a first agent and a second agent, according to an example embodiment of the present invention.

FIG. 3 shows a block diagram of first computer system 102, according to an example embodiment of the present invention. As shown in FIG. 3, first computer system 102 includes a client agent 300 and a network interface 304. Client agent 300 may be implemented in first computer system 102 instead of client agent 106 shown in FIG. 1, for example. Client agent 300 is configured to enable soft-binding data communications to occur between first and second computer systems 102 and 104. As shown in FIG. 3, client agent 300 includes a data request module 302 and a materialization module 306. Client agent 300 is described with respect to FIG. 4. FIG. 4 shows a flowchart 400 for a data communication between a first agent (e.g., client agent 300) and a second agent (e.g., a server agent such as second agent 108 of FIG. 1), according to an example embodiment. Further structural and operational embodiments will be apparent to persons skilled in the relevant art(s) based on the discussion regarding flowchart 400. Flowchart 400 is described as follows.

Figure 5:
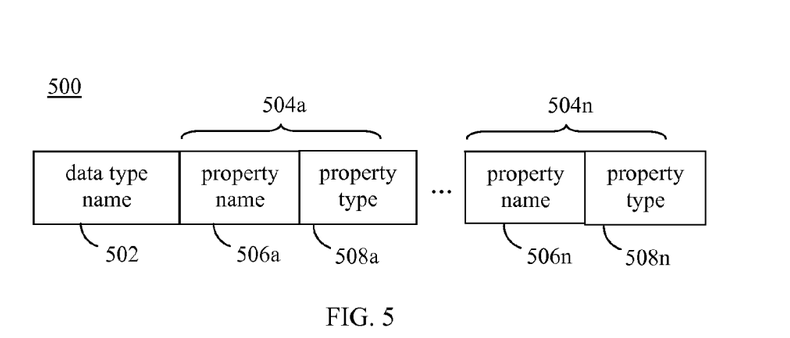
FIG. 5 shows a block diagram of a data type declaration used to define a data type.

In step 402, a first data type is associated with a request for a resource. As shown in FIG. 3, data request module 302 receives a request 308. Request 308 is a request for a resource at second computer system 104. Request 308 may have been generated by an application or other module operating at first computer system 102. In an embodiment, a first data type that is available at first computer system 102 is associated with request 308. The first data type may be a data type used by one or more applications at first computer system 102. A data type may be defined in any suitable manner, as desired for a particular application. For example, FIG. 5 shows a block diagram of a data type declaration 500 used to define a data type. As shown in FIG. 5, data type declaration 500 includes a data type name 502 and one or more property definitions 504a-504n. Data type name 502 indicates a name of the data type being declared by data type declaration 500. Each property definition 504 defines a corresponding property included in the data type being declared. As shown in FIG. 5, each property definition 504 indicates a corresponding property name 506 and a property type 508. Property name 506 indicates a name of the corresponding property, and property type 508 indicates a type of data defined by the corresponding property, such as an integer, a string, a date and/or time, etc.

Data type declaration 500 may be formed according to any suitable code, as desired for a particular application. For instance, a C# programming language form of data type declaration 500 may be expressed, as follows:

```
public class ClientPerson
{
    public int ID { get; set; }
    public string Name { get; set; }
    public int YearsOfExperience { get; set; }
}
``` where "ClientPerson" is the declared data type name (data type name 502), and three property definitions (property definitions 504a-504c) are included. A first property definition has a property name of "ID" (property name 506a) and a property type of "int" or integer (property type 508a). A second property definition has a property name of "Name" (property name 506b) and a property type of "string" (property type 508b). A third property definition has a property name of "YearsOfExperience" (property name 506c) and a property type of "int" (property type 508c).

Figure 6:
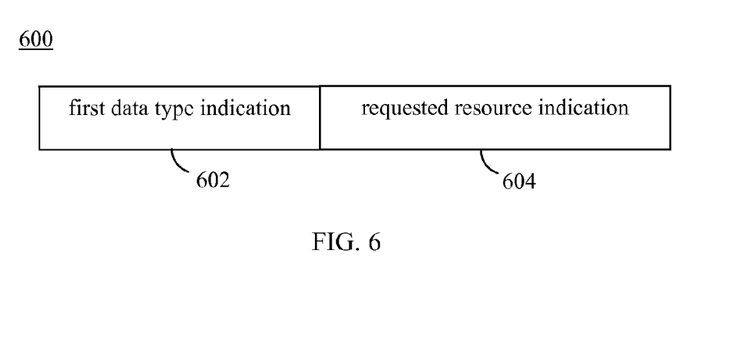
FIG. 6 shows a block diagram of a request for a resource, according to an example embodiment of the present invention.

Referring back to FIG. 3, request 308 may have any suitable form. For instance, FIG. 6 shows a block diagram of a request 600, according to an example embodiment. As shown in FIG. 6, request 600 includes a first data type indication 602 and a requested resource indication 604. Data type indication 602 indicates a target data type for materializing the requested resource indicated by requested resource indication 604 when received at client agent 300.

Request 600 may be formed according to any suitable code, as desired for a particular application. For instance, an example client library for this using the Microsoft® .NET Framework and the C# programming language may have an entry point that binds a particular type data with a particular request for data to form request 600, as follows:

var    req=CreateQuery<ClientPerson>("http://service.end.point/svc/People");

where "req" represents a request (e.g., a "query"), first data type indication 602 is "ClientPerson" (e.g., indicated between angled brackets < >) and requested resource indication 604 is "http://service.end.point/svc/People." Thus, in this example, the indicated first data type of "ClientPerson" would be used at client agent 300 to materialize the resource (or multiple resources) indicated to be located at "http://service.end.point/svc/People" at second computer system 104.

Referring back to FIG. 3, data request module 302 is optionally present. When present, data request module 302 is configured to convert request 308 to a network-transportable request 310, which has a network-transportable form (e.g., wire format). In an embodiment, network-transportable request 310 indicates the requested resource (e.g., includes requested resource indication 604 of FIG. 6), but does not indicate the first data type. When data request module 302 is not present, request 308 may be directly received by network interface 304.

Referring back to FIG. 4, in step 404, the request for the resource is transmitted to a second agent at a second computer system, the resource being instantiated at the second computer system according to a second data type that is different from the first data type. As shown in FIG. 3, network-transportable request 310 is received by network interface 304. Network interface 304 is configured to transmit request 310 in a first communication signal 312. For example, similarly to first communication signal 110 of FIG. 1, first communication signal 312 may transmitted from first computer system 102 through first communication link 122, network 116, and second communication link 124, to second computer system 104. First communication signal 312 may be transmitted in any form, including in the form of a stream of packets (e.g., IP packets). Second computer system 104 receives first communication signal 312.

Second agent 108 processes request 310 included in first communication signal 312. For example, request 310 may be a request for resource 120a stored in storage 118 associated with second computer system 104. Second agent 108 retrieves resource 120a from storage 118 to include in a response. Second agent 108 may retrieve resource 120a from a location in storage 118 indicated in request 310 (e.g., "http://service.end.point/svc/People," as in the above example request). Resource 120a is structured according to a second data type, which is different from the first data type associated with request 308. The second data type may be different in various ways from the first data type, including have a different name and/or structure. For instance, in an example, the first data type (associated with request 308) may be the "ClientPerson" data type shown above. The second data type may be defined at second computer system 104 according to the following data type declaration (e.g., in a C# example, provided for purposes of illustration):

```
public class Employee
{
    public int ID { get; set; }
    public string Name { get; set; }
    public short YearsOfExperience { get; set; }
}
``` where "Employee" is the declared data type name (data type name 502), and three property definitions (property definitions 504a-504c) are included. The property definitions of this example data type are the same as the property definitions as described above for the "ClientPerson" data type, except that although the third property definition of the "ClientPerson" and "Employee" data types has the same property name of "YearsOfExperience," the third property definition for the "ClientPerson" data type has the property type of "int," while the third property definition for the "Employee" data type has the property type of "short." Thus, in this example, the second data type "Employee" is different from the first data type "ClientPerson" because their data type names are different, and because the third property definitions have different property types.

Because in the current example, resource 120a is structured according to the "Employee" data type, resource 120a includes property name (property names 204 in FIG. 2) and data values (data values 206 in FIG. 2) for the three included properties. For instance, continuing the current example, resource 120a may include the values for the corresponding property names shown in Table 1 as follows:

TABLE 1

| Property Name | Data Value |
|---|---|
| ID | 1023 |
| Name | John Smith |
| YearsOfExperience | 3 |

Figure 7:
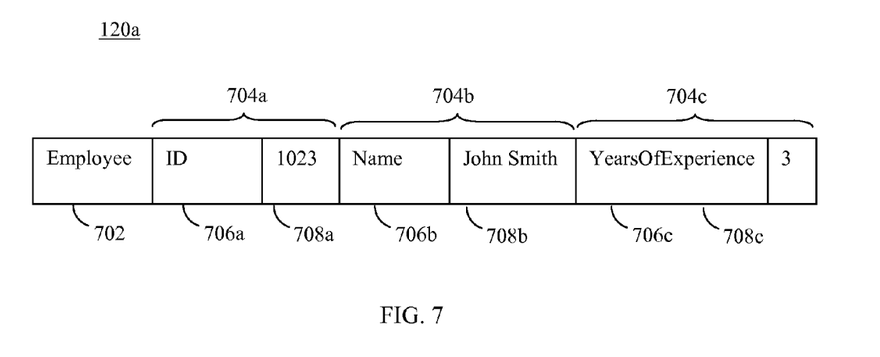
FIG. 7 shows a block diagram of an example resource instantiated at a server according to a server-side data type.

For example, FIG. 7 shows a block diagram of resource 120a as an instance of the "Employee" data type, having the data values indicated in Table 1. As shown in FIG. 7, resource 120a has a data type name 702 of "Employee" and first-third properties 704a-704c. First property 704a has a property name 706a of "ID" and a data value 708a of "1023," second property 704b has a property name 706b of "Name" and a data value 708b of "John Smith," and third property 704c has a property name 706c of "YearsOfExperience" and a data value 708c of "3."

Second agent 108 may convert resource 120a from the second data type to a data format that may be transmitted from computer system 104 (e.g., a wire format), in a manner that would be known to persons skilled in the relevant art(s). For instance, an example wire format may have XML (extensible markup language) format or other suitable format. Continuing the current example, where resource 120a has the values shown in Table 1, second agent 108 may convert resource 120a to XML format as follows:

```
<People>
    <Employee>
        <ID>1023</ID>
```

-continued

```
        <Name>John Smith</Name>
        <YearsOfExperience>3</YearsOfExperience>
    </Employee>
</People>
```

Where "People" indicates the location at which resource 120a was retrieved. Although in the current example, resource 120a is shown as a single "Employee" data item, additional "Employee" data items may be included in the above expression if resource 120a includes further "Employee" data items.

Second computer system 104 in FIG. 1 generates second communication signal 314 (shown in FIG. 3), which is a response signal that includes the requested resource 120a and includes an indication of the second data type (used for resource 120a at second computer system 104). Similarly to second communication signal 112 of FIG. 1, second communication signal 314 may be transmitted through second communication link 124, network 116, and first communication link 122, and is received by first computer system 102. Second communication signal 314 may be transmitted in any form, including in the form of a stream of packets (e.g., IP packets).

Referring to FIG. 4, in step 406, the resource is received from the second agent. As shown in FIG. 3, second communication signal 314 is received by network interface 304 of first computer system 102 from second computer system 104. Second communication signal 314 includes the requested resource provided by second agent 108, which in the current example is resource 120a. Network interface 304 outputs a network-transportable resource 316 extracted from second communication signal 314, which is a network transportable version of resource 120a (e.g., as shown above in XML format for the current example).

In step 408, the received resource is materialized into an instance of the first data type. In an embodiment, materialization module 306 shown in FIG. 3 is configured to materialize the received resource into an instance of the first data type. As shown in FIG. 3, materialization module 306 receives network-transportable resource 316. Furthermore, materialization module 306 receives a first data type indication 318, which is provided by data request module 302 (from request 308), and receives local data type definitions 322, which includes data types of first computer system 102. Materialization module 306 materializes network-transportable resource 316 into an instance of the first data type, the definition of which is selected from local data type definitions 322 (according to the data type indicated by first data type indication 318). In an embodiment, the materialized instance of the first data type may be stored in storage 114 by materialization module 306 as resource 320, as shown in FIG. 3.

Figure 8:
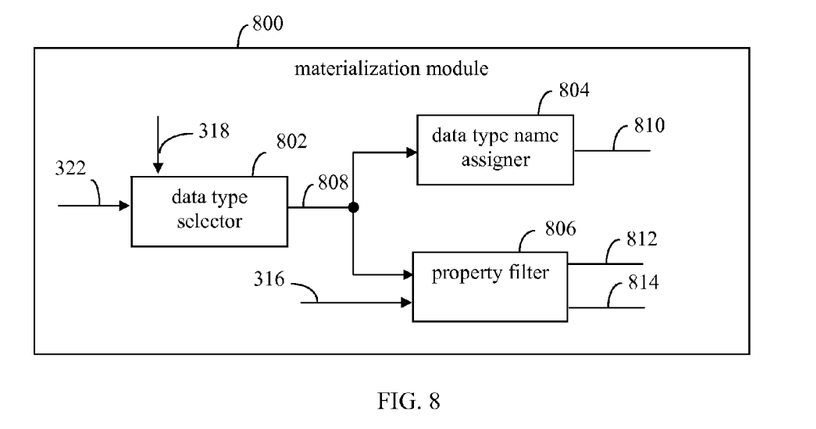
FIG. 8 shows a block diagram of a materialization module, according to an example embodiment of the present invention.

Materialization module 306 may be configured in various ways. For instance, FIG. 8 shows a block diagram of a materialization module 800, according to an example embodiment. Materialization module 800 is an example of materialization module 306 of FIG. 3. As shown in FIG. 8, materialization module 800 includes a data type selector 802, a data type name assigner 804 and a property filter 806. Data type selector 802 generates a first data type 808, which is the first data type used to materialize the received resource (e.g., network-transportable resource 316). Data type selector 802 receives first data type indication 318, which indicates the data type associated with the request for the resource from second computer system 104, and accesses the indicated data type from local data type definitions 322 (which may be a library of data type definitions at first computer system 102). First data type 808 includes the definition of the first data type, including the data type name and properties (e.g., the information of data type declaration 500). Data type name assigner 804 is configured to assign a data type name 810 to the materialized instance of the received resource. Property filter 806 is configured to compare the properties of the received resource with the properties defined for the first data type, to generate properties 812 (e.g., property name and data value pairs) for the materialized resource. For properties of the received resource and the first data type that match (e.g., properties having the same property name in network-transportable resource 316 and the first data type), materialization module 306 may output the matching properties (name/value pairs) as properties 812. Data type name 810 and properties 812 are included the generated instance of the first data type (e.g., resource 320 shown in FIG. 3).

For instance, in an example, network-transportable resource 316 may include the properties for resource 120a of FIG. 7, indicated in Table 1 shown above. Referring to FIG. 8, data type selector 802 may receive "ClientPerson" as first data type indication 318 included in request 308 in first computer system 102, and may access local data type definitions 322 to determine and output the "ClientPerson" data type definition as first data type 808. Data type name assigner 804 receives first data type 808, and outputs "ClientPerson" as data type name 810 for the "ClientPerson" data type. Property filter 806 receives the "ClientPerson" data type as first data type 808 and receives network-transportable resource 316. Property filter 806 compares the properties of network-transportable resource 316, which are "ID," "Name," and "YearsOfExperience," to the properties of the "ClientPerson" data type, which are "ID," "Name," and "YearsOfExperience." Because the "ID" and "Name" properties of network-transportable resource 316 and the "ClientPerson" data type match, the "ID" and "Name" property names are included in properties 812, as well as the corresponding data values of "1023" and "John Smith" received in network-transportable resource 316. Furthermore, because the property names of the "YearOfExperience" property of network-transportable resource 316 and the "ClientPerson" data type match, and the data values are represented the same (as long as overflow does not occur), the "YearsOfExperience" property name is included in properties 812, as well as the corresponding data value of "3" received in network-transportable resource 316.

Figure 9:
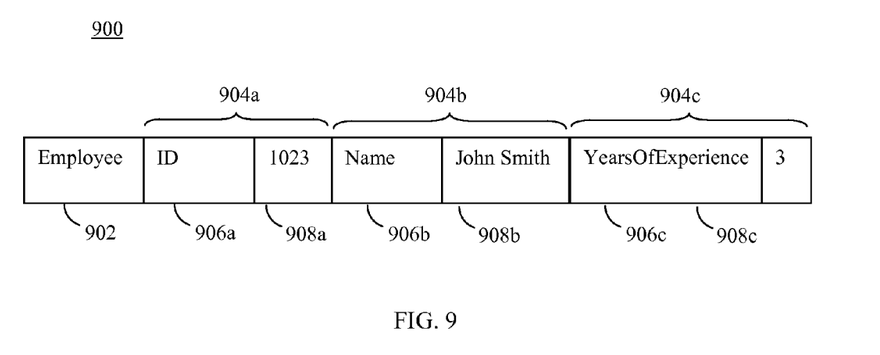
FIG. 9 shows a block diagram of a resource materialized at a client from the resource of FIG. 7 according to a client-side data type, according to an example embodiment of the present invention.

In such an embodiment, materialization module 306 shown in FIG. 3 generates resource. FIG. 9 shows a block diagram of a resource 900 generated by materialization module 306, which is an instance of the "ClientPerson" data type (first data type). As shown in FIG. 9, resource 120a has a data type name 902 of "ClientPerson" and first-third properties 904a-904c. First property 904a has a property name 906a of "ID" and a data value 908a of "1023," second property 904b has a property name 906b of "Name" and a data value 908b of "John Smith," and third property 904c has a property name 906c of "YearsOfExperience" and a data value 908c of "3."

In the just described example, the first and second data types included properties "ID" and "Name," which are matching, and both include the "YearsOfExperience" property with compatible data types ("int" and "short," compatible as long as overflow does not occur). However, the first and second data types had different data type names, "Employee" versus "ClientPerson." In another example, the second data type may include one or more properties that are not included in the first data type. In one embodiment, the extra property(s) may be omitted from the materialized instance of the first data type. In such an embodiment, servers are enabled to add new optional properties that will not "break" clients, enabling the servers to advance in version relative to clients. In another example, if the first and second data types have different numbers of properties, a failure to fully materialize the resource as an instance of the first data type may occur, and the failure may be indicated. For example, as shown in FIG. 8, property filter 806 may optionally generate a failure indicator signal 814. Failure indicator signal 814 may indicate a failure to materialize a received resource as an instance of the first data type if the second data type includes one or more properties not included in the first data type.

For example, the "Employee" data type at second computer system 104 may include, the "ID," "Name," and "YearsOfExperience" properties of the previous example, and may further include an "OfficeNumber" property. Resource 120a may be defined according to such an "Employee" data type, and may include data values for the corresponding property names shown in Table 2 as follows:

TABLE 2

| Property Name | Data Value |
|---|---|
| ID | 1023 |
| Name | John Smith |
| YearsOfExperience | 3 |
| OfficeNumber | 728 |

In this example, the "ClientPerson" data type at first computer system 104 may have the same definition as described above, having the "ID," "Name," and "YearsOfExperience," property names.

Continuing this example with reference to FIG. 8, data type name assigner 804 outputs "ClientPerson" as data type name 810 for the "ClientPerson" data type. Property filter 806 receives the "ClientPerson" data type as first data type 808 and receives network-transportable resource 316. Property filter 806 compares the properties of network-transportable resource 316, which are "ID," "Name," "YearsOfExperience," and "OfficeNumber" to the properties of the "ClientPerson" data type, which are "ID," "Name," and "YearsOfExperience." Because the "OfficeNumber" property is included in network-transportable resource 316, but not in the "ClientPerson" data type, property filter 806 may be configured to omit (not include) the "OfficeNumber" property in properties 812. In such case, the "ID," "Name," and "YearsOfExperience," property names are included in properties 812, as well as the corresponding data values of "1023," "John Smith," and "3" received in network-transportable resource 316. Alternatively, property filter 806 may generate a failure on failure indicator signal 814, indicating that the received resource included a property not included in the "ClientPerson" data type.

In another example, the first data type may include one or more properties that are not included in the second data type. In an embodiment, materialization module 306 may handle the additional property(s) by including a default value for a data value of each of the additional property(s) in the materialized instance of the first data type. Such an embodiment enables a client to advance in version relative to servers, without disabling communications.

For example, the "Employee" data type at second computer system 104 may include, the "ID," "Name," and "YearsOfExperience" properties of the previous example, and the "ClientPerson" data type at first computer system 104 may include these properties, and may further include a "ClientID" property. In such an example, data type name assigner 804 outputs "ClientPerson" as data type name 810 for the "ClientPerson" data type. Property filter 806 receives the "ClientPerson" data type as first data type 808 and receives network-transportable resource 316. Property filter 806 compares the properties of network-transportable resource 316, which are "ID," "Name," and "YearsOfExperience" to the properties of the "ClientPerson" data type, which are "ID," "Name," "YearsOfExperience," and "ClientID." Because the "ClientID" property is included in the "ClientPerson" data type, but not in network-transportable resource 316, property filter 806 may be configured to include a default data value for the "ClientID" property in properties 812 (e.g., a zero value, a value that indicates no client ID was received, etc.). In such case, the "ID," "Name," "YearsOfExperience," and "ClientID" property names are included in properties 812, as well as the corresponding data values of "1023," "John Smith," "3," and a default value, such as "0."

Client agent 300, data request module 302, materialization module 306, materialization module 800, data type selector 802, data type name assigner 804, property filter 806, and flowchart 400 may be implemented in hardware, software, firmware, or any combination thereof. For example, client agent 300, data request module 302, materialization module 306, materialization module 800, data type selector 802, data type name assigner 804, property filter 806, and/or flowchart 400 may be implemented as computer program code configured to be executed in one or more processors. Alternatively, client agent 300, data request module 302, materialization module 306, materialization module 800, data type selector 802, data type name assigner 804, property filter 806, and/or flowchart 400 may be implemented as hardware logic/electrical circuitry.

B. Example Materialization Embodiments in Inheritance Hierarchies

Inheritance hierarchies establish relationships between data types. A data type can be a subtype of another data type (a "derived" type) or a supertype of another data type (a "base" type). A given type may have zero or more supertypes and zero or more subtypes, forming a tree of data types. When data types are organized in a hierarchy, sets of instances that share a common base data type can be treated uniformly through that base type interface; these are polymorphic sets.

Figure 10:
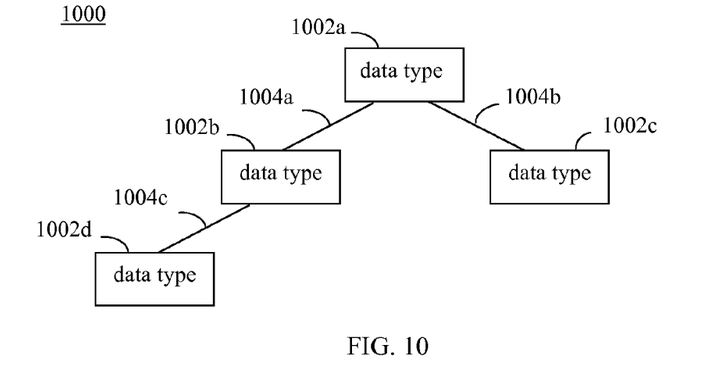
FIG. 10 shows a block diagram of an example tree of data types arranged in a relationship hierarchy.

For example, FIG. 10 shows a tree 1000 of data types 1002a-1002d, indicating relationships between data types. Although four data types 1002a-1002d are shown in FIG. 10 for tree 1000, any number of data types 1002 may be present in such a tree. As shown in data type 1002a is a base data type for tree 1000. Data type 1002a includes a set of properties that are also included in data types 1002b-1002c. Data types 1002b and 1002c are data types derived from data type 1002a (subtypes of data type 1002a), as indicated by a link 1004a between data type 1002a and data type 1002b, and a link 1004b between data types 1002a and 1002c. Data types 1002b and 1002c include the properties of data type 1002a, and each include one or more further properties. Data type 1002d is a data type derived from data type 1002, as indicated by a link 1004c between data type 1002b and data type 1002d. Data type 1002d includes the properties of data type 1002b, and includes one or more further properties.

To further illustrate the concept of inheritance hierarchies, example data type declarations (C# examples, provided for purposes of illustration) for each of data types 1002a-1002d are shown below. For instance, a "Person" data type is shown as follows as an example of data type 1002a:

```
class Person
{
    public string Name;
    public string Phone;
}
```

As shown above, the "Person" data type includes "Name" and "Phone" properties. In this example, the "Person" data type is a base data type. An "Employee" data type is shown as follows as an example of data type 1002*b*:

```
public Employee: Person
{
    public int EmployeeID;
    public bool IsFullTime;
    public decimal Salary;
}
```

As shown above, the "Employee" data type has a derived inheritance relationship with data type 1002*a*, as indicated by the recitation of "Person." As such, the "Employee" data type inherits the declared properties of the "Person" data type, which are the "Name" and "Phone" properties. The "Employee" data type further includes the "EmployeeID," "IsFullTime," and "Salary" properties. A "Customer" data type is shown as follows as an example of data type 1002*c*:

```
public Customer: Person
{
    public int CustomerID;
}
```

As shown above, the "Customer" data type has a derived inheritance relationship with data type 1002*a*, as indicated by the recitation of "Person." As such, the "Customer" data type inherits the declared properties of the "Person" data type, which are the "Name" and "Phone" properties. The "Customer" data type further includes the "CustomerID" property. An "ExecutiveEmployee" data type is shown as follows as an example of data type 1002*d*:

```
public ExecutiveEmployee: Employee
{
    public string Title;
}
```

As shown above, the "ExecutiveEmployee" data type has a derived inheritance relationship with data type 1002*b*, as indicated by the recitation of "Employee." As such, the "ExecutiveEmployee" data type inherits the declared properties of the "Employee" data type, which are the "Name," "Phone," "EmployeeID," "IsFullTime," and "Salary" properties. The "ExecutiveEmployee" data type further includes the "Title" property.

An important difference from the materialization perspective between monomorphic (non-hierarchical) and polymorphic data type sets is that a single data type specification during request creation on the client may not be enough information for materialization of a polymorphic set on the client side. The single data type specification may be enough to indicate what the base type is, but actual materialized instances may be subtypes of that base type.

In embodiments, the soft-binding approach enables various implementations with regard to inheritance hierarchies. For example, in one embodiment, the client-side and server-side data type hierarchies match. In this case, the data type information associated with a data item being received from the server, which is a server-side data type (second data type), may be used to determine the client-side type (first data type) to use, where data type names used on the client and server are the same.

In an example of matching client-side and server-side data type hierarchies, first computer system 102 and second computer system 104 in FIG. 1 may each have a data type hierarchy similar to tree 1000 shown in FIG. 10, of the "Person," "Employee," "Customer," and "ExecutiveEmployee" data types described above. In such case, materialization module 306 shown in FIG. 3 may receive network-transportable resource 316 that indicates one of "Person," "Employee," "Customer," and "ExecutiveEmployee" as the data type. Referring to FIG. 8, in an embodiment (not shown in FIG. 8), data type selector 802 may receive the indication of the data type provided from the server agent in network-transportable resource 316. Data type selector 802 may be configured to determine whether the data type of network-transportable resource 316 has the same data type name as a hierarchical data type of local data type definitions 322. Data type selector 802 may select the same named hierarchical data type of local data type definitions 322 (if present) to be output as first data type 808 to be used to materialize network-transportable resource 316 into resource 320 (FIG. 3). In this manner, the same inheritance hierarchies are used at both of first and second computer systems 102 and 104 for resources defined according to the hierarchical data types.

In an embodiment where the first data type at the client and the second data type at the server are both "flat" (contain no hierarchy), a transfer of data from the server to the client may proceed as described above in the previous subsection.

In another embodiment, the client-side may have a data type hierarchy while the server-side does not (the server-side is flat), or the server-side may have a data type hierarchy while the client-side does not. In such an embodiment, the side (client or server) that is flat may ignore received data type information and treat all the properties as if they were coming from a common data type that encompasses the properties of all the data types of the hierarchy on the other side. This enables consumption and modification of received data, but creates challenges around creating new data items, because the "flat" side does not have complete data type information.

In the presence of inheritance hierarchies, specifying the target type (client-side, first data type) when the request for the resource (e.g., request 308 of FIG. 3) is generated may not be possible. In an embodiment, a type mapper may be used to map between data type names (or other constructs such as a property included in the resource(s) received from the server) and actual type descriptors (e.g., System.Type instances in the case of the Microsoft® .NET Framework). For instance, a developer may configure a type mapper to a soft-binding-enabled client library so that the names of subtypes in data items can be mapped from server data type names to client data type names. While not as decoupled as a flat case, because the client has knowledge of the data type names at the server, such an embodiment is more decoupled than actually matching data type names between the client and server.

Figure 11:
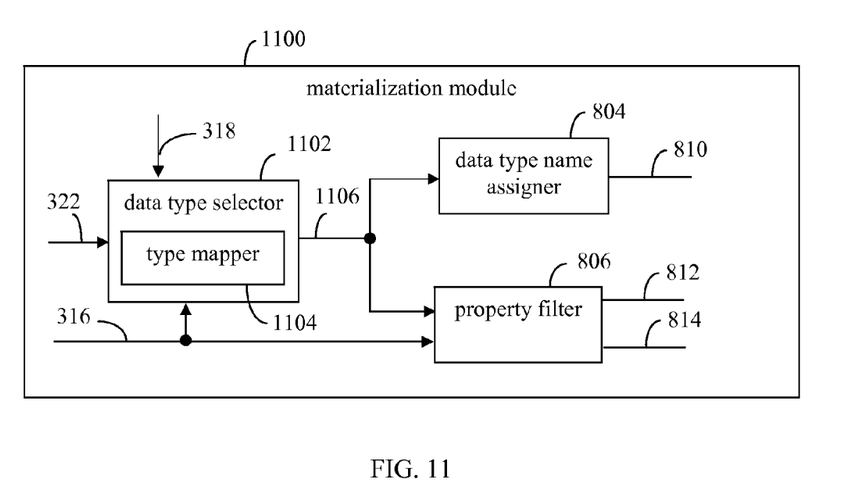
FIG. 11 shows a block diagram of a materialization module, according to an example embodiment of the present invention.

For instance, FIG. 11 shows a block diagram of a materialization module 1100, according to an example embodiment. Materialization module 1100 is an example of materialization module 306 of FIG. 3. As shown in FIG. 11, materialization module 1100 includes a data type selector 1102, data type name assigner 804, and property filter 806. Data type selector 1102 includes a type mapper 1104. Data type selector 1102 is generally similar to data type selector 802 of FIG. 8, with differences described as follows.

Figure 12:
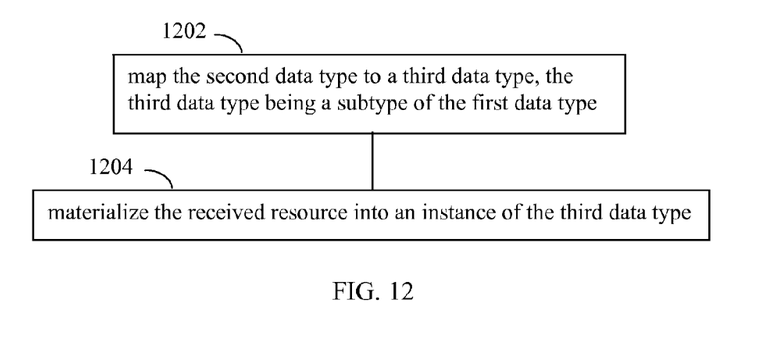
FIG. 12 shows steps that may be performed during the flowchart of FIG. 4, according to an example embodiment of the present invention.

Materialization module 1100 is described with respect to FIG. 12, which shows steps that may be performed in flowchart 400 to replace step 408, according to an example embodiment. Further structural and operational embodiments will be apparent to persons skilled in the relevant art(s) based on the discussion regarding FIG. 12. FIGS. 11 and 12 are described as follows.

After performing steps 402-406 of flowchart 400, in step 1202, the second data type is mapped to a third data type, the third data type being a subtype of the first data type. Referring to FIG. 11, in an embodiment, data type selector 1102 determines a data type in which to materialize the resource received from second computer system 104. Data type selector 802 receives first data type indication 318, which indicates the data type associated with the request for the resource from second computer system 104. In the current embodiment, the first data type associated with the request is a base data type (e.g., data type 1002*a* of FIG. 10) of a hierarchy of data types at first computer system 102. Data type selector 802 also receives the indication of the data type provided from the server agent (the second data type received in network-transportable resource 316). The received second data type may be a data type in a hierarchy of data types at second computer system 104. Type mapper 1104 of data type selector 1102 is configured to map the received second data type to a data type (a third data type) in the hierarchy of data types at first computer system 102 that has the first data type (associated with the request) as the base data type. Type mapper 1104 may store/access a data type map that includes a mapping of hierarchical server data types to hierarchical client data types to determine the third data type.

For instance, Table 3 shown below is an example data type map that may be included in, or accessed by type mapper 1104:

TABLE 3

| Server Data Types (second data type) | Client Data Types (third data type) |
|---|---|
| Person | ClientPerson |
| Employee | ClientEmployee |
| Customer | ClientCustomer |
| ExecutiveEmployee | ClientExecutive |

In this example, second computer system 104 has a hierarchy of data types that includes "Person," "Employee," "Customer," and "ExecutiveEmployee" data types, similar to the description provided above. First computer system 102 includes a corresponding hierarchy of data type that includes "ClientPerson," "ClientEmployee," "ClientCustomer," and "ClientExecutive" data types, where "ClientPerson" is the base data type, and "ClientEmployee," "ClientCustomer," and "ClientExecutive" are derived data types. The data type map may have any suitable data structure, and may be stored in any suitable form.

An illustrative example of type mapping is provided as follows: Referring to step 402 of FIG. 4, in an embodiment, request 308 (FIG. 3) at client agent 300 indicates the base data type of the data type hierarchy at first computer system 102. For instance, in the example of Table 3, request 308 may indicate "ClientPerson" as the first (base) data type. Furthermore, request 308 may indicate the location of the requested resource at second computer system 104, such as "http://service.end.point/svc/Customer." In response to network-transportable request 310 (based on request 308) being transmitted from first computer system 102 to second computer system 104 (step 404), as described above, network-transportable resource 316 may be received (step 406), including a data item having the "Customer" data type at second computer system 104. According to step 1202 (FIG. 12), the "Customer" data type may be mapped by type mapper 1104 to the "ClientCustomer" data type at first computer system 104, using Table 3 as a data type map. As shown in FIG. 11, data type selector 1102 outputs the mapped data type of "ClientCustomer" as a third data type 1106, which used to materialize network-transportable resource 316 (as described below).

Referring back to FIG. 12, in step 1204, the received resource is materialized into an instance of the third data type. For example, step 1204 may be performed in a manner similar to step 408 described above with respect to flowchart 400 (FIG. 4), using the third data type determined in step 1202 instead of the first data type associated with the request.

For instance, referring to FIG. 11, in the current example where "ClientCustomer" is the third data type, data type name assigner 804 receives "ClientCustomer" as third data type 1106. Data type name assigner 804 outputs "ClientCustomer" as data type name 810. Property filter 806 receives the "ClientCustomer" data type as third data type 1106 and receives network-transportable resource 316, which has the server-side data type of "Customer." Property filter 806 compares the properties of the "ClientCustomer" data type and those included in network-transportable resource 316, and generates properties 812 based on the comparison (e.g., as described in the prior subsection). The generated data type name 810 and properties 812 are included in the instance of the third data type.

Materialization module 1100, data type selector 1102, type mapper 1104, and flowchart 1200 may be implemented in hardware, software, firmware, or any combination thereof. For example, materialization module 1100, data type selector 1102, type mapper 1104, and flowchart 1200 may be implemented as computer program code configured to be executed in one or more processors. Alternatively, materialization module 1100, data type selector 1102, type mapper 1104, and flowchart 1200 may be implemented as hardware logic/electrical circuitry.

IV. Further Example System Embodiments

Figure 13:
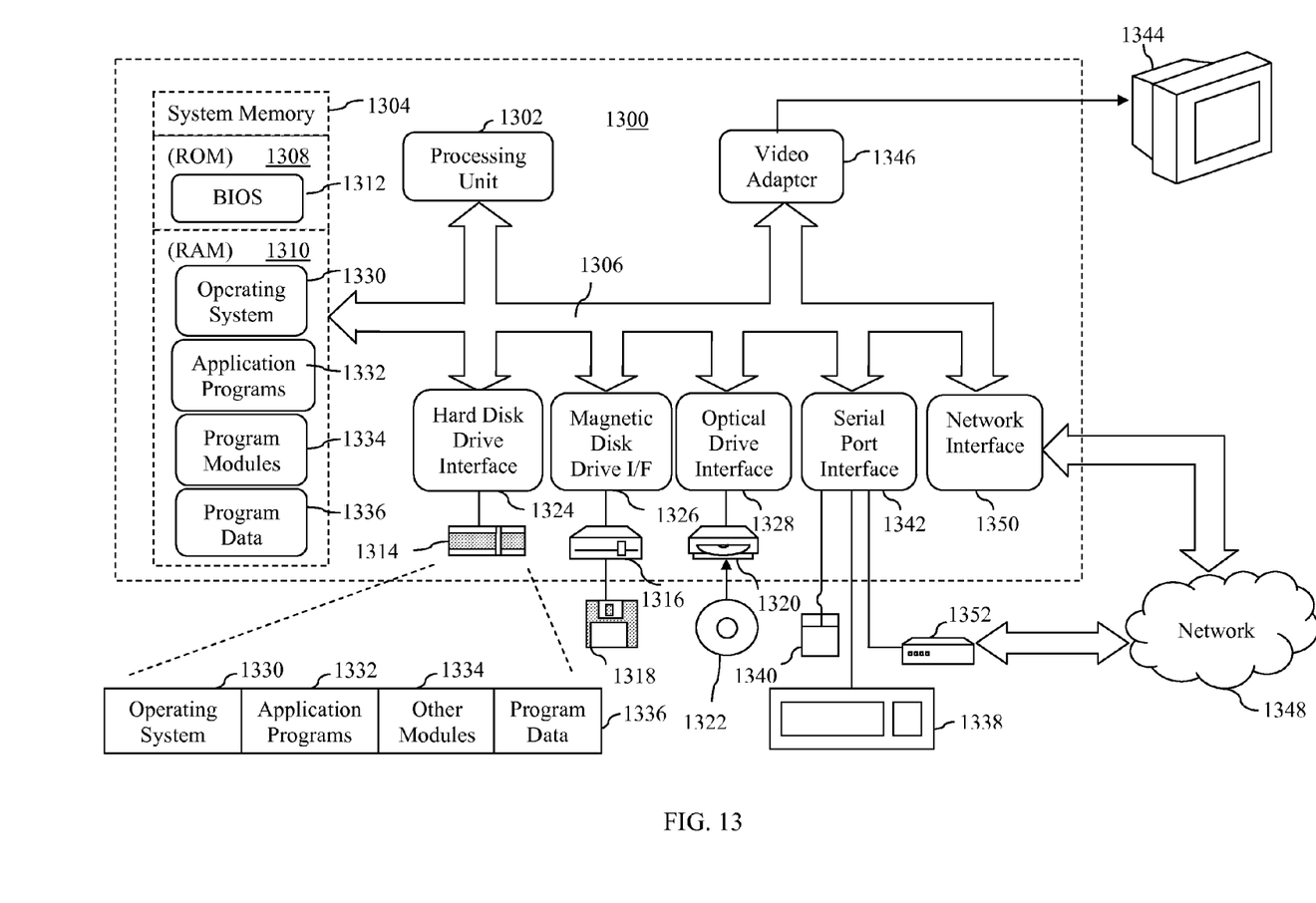
FIG. 13 shows a block diagram of an example computer that may be used to implement embodiments of the present invention.

FIG. 13 depicts an exemplary implementation of a computer 1300 in which embodiments of the present invention may be implemented. Computer systems 102 and 104 shown in FIG. 1 may be implemented similarly to computer 1300, including one or more features of computer 1300 and/or alternative features. Computer 1300 may be a general-purpose computing device in the form of a conventional personal computer, a mobile computer, or a workstation, for example, or computer 1300 may be a special purpose computing device. The description of computer 1300 provided herein is provided for purposes of illustration, and is not intended to be limiting. Embodiments of the present invention may be implemented in further types of computer systems, as would be known to persons skilled in the relevant art(s).

As shown in FIG. 13, computer 1300 includes a processing unit 1302, a system memory 1304, and a bus 1306 that couples various system components including system memory 1304 to processing unit 1302. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1330, one or more application programs 1332, other program modules 1334, and program data 1336. Application programs 1332 or program modules 1334 may include, for example, computer program logic for implementing client agent 300, data request module 302, materialization module 306, materialization module 800, data type selector 802, data type name assigner 804, property filter 806, materialization module 1100, data type selector 1102, type mapper 1104, flowchart 400 (including any step of flowchart 400), step 1202, and/or step 1204, as described above.

A user may enter commands and information into the computer 1300 through input devices such as keyboard 1338 and pointing device 1340. Other input devices (not shown) may include a microphone, joystick, game pad, satellite dish, scanner, or the like. These and other input devices are often connected to the processing unit 1302 through a serial port interface 1342 that is coupled to bus 1306, but may be connected by other interfaces, such as a parallel port, game port, or a universal serial bus (USB).

A monitor 1344 or other type of display device is also connected to bus 1306 via an interface, such as a video adapter 1346. In addition to the monitor, computer 1300 may include other peripheral output devices (not shown) such as speakers and printers.

Computer 1300 is connected to a network 1348 (e.g., the Internet) through a network interface or adapter 1350, a modem 1352, or other means for establishing communications over the network. Modem 1352, which may be internal or external, is connected to bus 1306 via serial port interface 1342.

As used herein, the terms "computer program medium" and "computer-readable medium" are used to generally refer to media such as the hard disk associated with hard disk drive 1314, removable magnetic disk 1318, removable optical disk 1322, as well as other media such as flash memory cards, digital video disks, random access memories (RAMs), read only memories (ROM), and the like.

As noted above, computer programs and modules (including application programs 1332 and other program modules 1334) may be stored on the hard disk, magnetic disk, optical disk, ROM, or RAM. Such computer programs may also be received via network interface 1350 or serial port interface 1342. Such computer programs, when executed or loaded by an application, enable computer 1300 to implement features of embodiments of the present invention discussed herein. Accordingly, such computer programs represent controllers of the computer 1300.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a first computer system, the first computer system including a first agent implemented at least partially in hardware, comprising:
    associating a first data type with a request for a resource, the first data type representing a data type for materialization of the resource at the first computer system;
    transmitting the request for the resource to a second agent at a second computer system, the resource at the second computer system having a second data type that is different from the first data type;
    receiving the resource from the second agent; and
    materializing the received resource into an instance of the first data type using the first agent at the first computer system.

2. The method of claim 1, wherein said receiving comprises:
    receiving the resource including a plurality of properties represented as name/value pairs that each include a property name and a data value, the plurality of name/value pairs being instantiated at the second agent according to the second data type;
    wherein said materializing comprises:
    materializing the properties as an instance of the first data type.

3. The method of claim 1, wherein the second data type includes a property that is not included in the first data type, wherein said receiving comprises:
    receiving the resource including the property from the second agent;
    wherein said materializing comprises:
    omitting the property from the instance of the first data type.

4. The method of claim 1, wherein the second data type includes a property that is not included in the first data type, wherein said receiving comprises:
    receiving the resource including the property from the second agent;

wherein said materializing comprises:
  indicating a failure to fully materialize the resource as an instance of the first data type.

5. The method of claim 1, wherein the first data type includes a property that is not included in the second data type, wherein said materializing comprises:
  including a default value for a data value of the property in the instance of the first data type.

6. The method of claim 1, wherein the second data type contains a hierarchical relationship with a third data type, wherein said receiving comprises:
  receiving an indication of the second data type with the resource from the second agent;
wherein said materializing comprises:
  ignoring the received indication of the second data type.

7. A client agent implemented at least partially in hardware in a first computer system, comprising:
  at least one processor that implements:
    first program code configured to transmit a request for a resource, the request having an associated first data type, the first data type representing a data type for materialization of the resource at the first computer system, the resource being instantiated at a second computer system according to a second data type that is different from the first data type; and
    second program code configured to receive the resource from a server agent at the second computer system that transmits the resource in response to the request being transmitted from the first computer system, and to materialize the received resource into an instance of the first data type.

8. The client agent of claim 7, wherein the received resource includes a plurality of properties represented as name/value pairs that each include a property name and a data value, the plurality of name/value pairs being instantiated at the second computer system according to the second data type, and the second program code being configured to materialize the properties as an instance of the first data type.

9. The client agent of claim 7, wherein the first data type is included in a data type tree at the first computer system, and the second program code is configured to materialize the received resource into an instance of a data type of the data type tree.

10. The client agent of claim 7, wherein the second data type includes a property that is not included in the first data type, the received resource includes the property, and the second program code is configured to omit the property from the instance of the first data type.

11. The client agent of claim 7, wherein the second data type includes a property that is not included in the first data type, the received resource includes the property, and the second program code is configured to indicate a failure to fully materialize the resource as an instance of the first data type.

12. The client agent of claim 7, wherein the first data type includes a property that is not included in the second data type, and the second program code is configured to include a default value for a data value of the property in the instance of the first data type.

13. The client agent of claim 7, wherein the second data type contains a hierarchical relationship with a third data type, an indication of the second data type is received with the resource from the second computer system, and the second program code is configured to ignore the received indication of the second data type.

14. A computer program product comprising a computer-readable storage device having computer program logic recorded thereon for enabling a processor to perform a data communication, comprising:
  first computer program logic that enables the processor to associate a first data type with a request for a resource to be transmitted to a second agent at a second computer system, the first data type representing a data type for materialization of the resource at the first computer system, the resource being instantiated at the second computer system according to a second data type that is different from the first data type; and
  second computer program logic that enables the processor to materialize the resource received from the second agent in response to the request into an instance of the first data type.

15. The computer program product of claim 14, wherein the resource includes a plurality of properties represented as name/value pairs that each include a property name and a data value, the plurality of name/value pairs being instantiated at the second computer system according to the second data type;
  wherein said second computer program logic comprises:
    third computer program logic that enables the processor to materialize the properties as an instance of the first data type.

16. The computer program product of claim 14, wherein the second data type includes a property that is not included in the first data type, wherein the received resource includes the property;
  wherein said second computer program logic comprises:
    third computer program logic that enables the processor to omit the property from the instance of the first data type.

17. The computer program product of claim 14, wherein the second data type includes a property that is not included in the first data type, wherein the received resource includes the property;
  wherein said second computer program logic comprises:
    third computer program logic that enables the processor to indicate a failure to fully materialize the resource as an instance of the first data type.

18. The computer program product of claim 14, wherein the first data type includes a property that is not included in the second data type, wherein said second computer program logic comprises:
  third computer program logic that enables the processor to include a default value for a data value of the property in the instance of the first data type.

19. The computer program product of claim 14, wherein the second data type contains a hierarchical relationship with a third data type, wherein an indication of the second data type is received with the resource from the second agent;
  wherein said second computer program logic comprises:
    third computer program logic that enables the processor to ignore the received indication of the second data type.

20. A method in a first computer system, the first computer system including a first agent implemented at least partially in hardware, comprising:
  associating a first data type with a request for a resource;
  transmitting the request for the resource to a second agent at a second computer system, the resource being instantiated at the second computer system according to a second data type that is different from the first data type;
  receiving the resource and an indication of the second data type from the second agent;

mapping the second data type to a third data type, the third data type being a subtype of the first data type; and materializing the received resource into an instance of the third data type.

* * * * *